United States Patent
Wilhelmsson et al.

(10) Patent No.: US 8,538,469 B2
(45) Date of Patent: Sep. 17, 2013

(54) METHOD FOR INITIAL SCANNING OF FREQUENCIES, FREQUENCY SCANNING CONTROLLER, AND APPARATUS

(75) Inventors: Leif Wilhelmsson, Dalby (SE); Bengt Lindoff, Bjärred (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 13/391,304

(22) PCT Filed: Aug. 25, 2009

(86) PCT No.: PCT/EP2009/060945
§ 371 (c)(1),
(2), (4) Date: Apr. 30, 2012

(87) PCT Pub. No.: WO2011/023226
PCT Pub. Date: Mar. 3, 2011

(65) Prior Publication Data
US 2012/0208528 A1 Aug. 16, 2012

(51) Int. Cl.
*H04B 15/00* (2006.01)

(52) U.S. Cl.
USPC ...... 455/501; 455/434; 455/552.1; 455/550.1

(58) Field of Classification Search
USPC .............. 455/501, 434, 552.1, 550.1
See application file for complete search history.

(56) References Cited

U.S. PATENT DOCUMENTS

| | | | |
|---|---|---|---|
| 8,385,978 B2 * | 2/2013 | Leung et al. | 455/562.1 |
| 2007/0066226 A1 * | 3/2007 | Cleveland et al. | 455/63.1 |
| 2008/0026718 A1 | 1/2008 | Wangard et al. | |
| 2008/0200195 A1 * | 8/2008 | Abe et al. | 455/501 |
| 2009/0124200 A1 | 5/2009 | Hall et al. | |
| 2009/0258672 A1 * | 10/2009 | Camp et al. | 455/553.1 |
| 2010/0015978 A1 * | 1/2010 | Yoon et al. | 455/435.3 |
| 2010/0142477 A1 * | 6/2010 | Yokota | 370/331 |

FOREIGN PATENT DOCUMENTS

WO 2005/099174 A1 10/2005

OTHER PUBLICATIONS

European Search Report, dated May 11, 2010, in connection with International Application No. PCT/EP2009/06945.
Mahmoud, H. et al. "OFDM for cognitive radio: merits and challenges" IEEE Wireless Communications, IEEE Service Center, Piscataway, NJ, US, vol. 16, No. 2, Apr. 1, 2009, pp. 6-15, XP011281227, ISSN: 1536-1284.

(Continued)

*Primary Examiner* — Danh Le
(74) *Attorney, Agent, or Firm* — Potomac Patent Group PLLC

(57) ABSTRACT

A method for initial scanning of frequencies at start-up of a multi-band cellular communication apparatus is disclosed. The method comprises determining whether there is any interfering signal from any other communication system transmitting at a frequency in vicinity of frequencies of frequency bands of which the multi-band cellular communication apparatus is supposed to establish contact with a base station in at least one of the frequencies within the frequency bands. If the determination gives a result of no interfering signal, a first scan procedure is applied comprising plain scanning of the frequencies of the frequency bands of which the multi-band cellular communication apparatus is supposed to establish contact with a base station in at least one of the frequencies within the frequency bands, or if the determination gives a result of an interfering signal, a second scan procedure is applied, taking into account the determined interfering signal. A frequency scanning apparatus for initial scanning, and a radio access circuitry for such initial scanning is also disclosed.

16 Claims, 3 Drawing Sheets

(56) References Cited

OTHER PUBLICATIONS

Guoqing Li et al. "Spectrum-sensing based interference mitigation for WLAN devices" 3rd International Conference and Workshops on Communication Systems Software and Middleware, COMSWARE, 2008, IEEE, Piscataway, NJ, USA, Jan. 6, 2008, pp. 402-408, XP031279712, ISBN: 978-1-4244-1796-4.

International Preliminary Report on Patentability, dated Oct. 10, 2011, in connection with International Application No. PCT/EP2009/06945.

* cited by examiner

METHOD FOR INITIAL SCANNING OF FREQUENCIES, FREQUENCY SCANNING CONTROLLER, AND APPARATUS

TECHNICAL FIELD

The present invention relates to a method for initial scanning of frequencies at start-up of a multi-band cellular communication apparatus, a frequency scanning controller, and an apparatus including such a controller.

BACKGROUND

Communication apparatuses, such as cellular phones, modem devices for wireless wide area networks, or communication devices for machine to machine communication using a cellular network, are nowadays arranged to be able to communicate on a wide range of frequency bands. At start-up, the apparatus scans available frequency bands for finding a base station to establish contact with. Due to the increasing number of different frequency bands available, of which at least a few can be used at a specific location while other can be used at another location depending on local regulations for frequency allocation, the scanning procedure can take relatively long time. Scanning is further complicated if there is any interference present in the frequency bands. WO 2005/099174 discloses a frequency selection method for a wireless system where other systems might interfere within the used frequency band. Frequencies having a predetermined level of interference are avoided, and channel search thus avoids disturbed channels, whereby the search can be faster.

In addition to this, other communication technologies, e.g. non-cellular systems such as Bluetooth wireless technology, Wireless Local Area Network (WLAN) technologies, or any short-range radio technology, present at adjacent frequency bands can introduce interference that may disturb the scanning for establishing cellular communication, especially for frequencies of the scanned frequency bands that are in vicinity of such adjacent frequency bands, i.e. a noise floor at frequencies in vicinity of frequencies where such other communication technologies are used can be considerably raised. This may further increase time for establishing cellular communication, and also increase the power consumption for the scanning as the scanning procedure becomes more complex to be able to deal with the interference.

It is therefore a desire to increase efficiency of establishing cellular communication at start-up of a cellular communication apparatus.

SUMMARY

The present invention is based on the understanding that the scanning procedure can be adapted to how hard it is to distinguish the desired signals from a cellular communication network from any interference. The inventors have found that considerable time and power can be saved by applying a plain, i.e. less complex, scanning when no interferers are present, while keeping reliability by applying an adapted, i.e. more complex, scanning when there are interferers present at adjacent frequency bands.

According to a first aspect, there is provided a method for initial scanning of frequencies at start-up of a multi-band cellular communication apparatus. The method comprises determining whether there is any interfering signal from any other communication system transmitting at a frequency in vicinity of frequencies of frequency bands of which the multi-band cellular communication apparatus is supposed to establish contact with a base station in at least one of the frequencies within the frequency bands. If the determination gives a result of no interfering signal, a first scan procedure is applied comprising plain scanning of the frequencies of the frequency bands of which the multi-band cellular communication apparatus is supposed to establish contact with a base station in at least one of the frequencies within the frequency bands, or if the determination gives a result of an interfering signal, a second scan procedure is applied, taking into account the determined interfering signal.

The determining whether there is any interfering signal may comprise detecting signal energy on at least one frequency in vicinity of frequencies of the frequency bands of which the multi-band cellular communication apparatus is supposed to establish contact with a base station in at least one of the frequencies within the frequency bands. The determining whether there is any interfering signal may alternatively or additionally comprise receiving information about presence of an interfering signal from circuitry within the cellular communication apparatus transmitting at a frequency in vicinity of frequencies of the frequency bands of which the multi-band cellular communication apparatus is supposed to establish contact with a base station in at least one of the frequencies within the frequency bands.

The determining whether there is any interfering signal may comprise receiving information about probability of presence of an interfering signal from circuitry holding a priori knowledge of such interfering signal.

The second scan procedure may comprise excluding at least a part of the frequency band being in vicinity of the determined interfering signal from the frequency scan, wherein the exclusion is based on the interfering signal.

The second scan procedure may comprise performing additional signal processing for at least a part of the frequency band being in vicinity of the determined interfering signal at the frequency scan, such that the determined interfering signal is taken into account. The second scan procedure may provide increased signal collection for the at least a part of the frequency band being in vicinity of the determined interfering signal.

According to a second aspect, there is provided a computer program including program instructions which when executed by a processor cause the processor to perform the method according to the first aspect.

According to a third aspect, there is provided a frequency scanning apparatus for initial scanning of frequencies at start-up of a multi-band cellular communication apparatus, where there may be any interfering signal from any other communication system transmitting at a frequency in vicinity of frequencies of frequency bands of which the multi-band cellular communication apparatus is supposed to establish contact with a base station in at least one of the frequencies within the frequency bands. The frequency scanning apparatus is arranged to determine whether there is an interfering signal, and if the result of the determination is no interfering signal, apply a first scan procedure comprising plain scanning of the frequencies of the frequency bands of which the multi-band cellular communication apparatus is supposed to establish contact with a base station in at least one of the frequencies within the frequency bands, or if the result of the determination is an interfering signal, apply a second scan procedure taking into account the determined interfering signal.

The second scan procedure may comprise excluding at least a part of the frequency band being in vicinity of the determined interferer from the frequency scan, wherein the exclusion is based on the interfering signal.

The second scan procedure may comprise performing additional signal processing for at least a part of the frequency band being in vicinity of the determined interferer at the frequency scan, such that the determined interfering signal is taken into account.

The second scan procedure may provide increased signal collection for the at least a part of the frequency band being in vicinity of the determined interfering signal.

The frequency scanning apparatus according may further be arranged to collect information about any of the interfering signal. The collected information whether there is any interfering signal may comprise information about presence of an interfering signal from circuitry within the cellular communication apparatus transmitting at a frequency in vicinity of frequencies of the frequency bands of which the multi-band cellular communication apparatus is supposed to establish contact with a base station in at least one of the frequencies within the frequency bands. The collected information whether there is any interfering signal may comprise information about probability of presence of an interfering signal from circuitry holding a priori knowledge of such interfering signal.

According to a fourth aspect, there is provided a radio access circuitry for initial scanning of frequencies at start-up of a multi-band cellular communication apparatus. The circuitry comprises a receiver arranged to tune to any frequency in vicinity of frequencies of frequency bands of which the multi-band cellular communication apparatus is supposed to establish contact with a base station in at least one of the frequencies within the frequency bands, a signal energy determining circuit arranged to determine signal energy at the any frequency to determine whether there is any interfering signal from any other communication system transmitting at the any frequency; and a frequency scanning apparatus according to the third aspect, wherein the receiver is further arranged to be tuned to frequencies according to the applied frequency scanning procedure.

The signal energy determining circuit may comprise a signal energy metering circuit arranged to measure signal energy of the any interfering signal.

The signal energy determining circuit may comprise a signal energy information receiver arranged to receive information from a source of the any interfering signal.

DETAILED DESCRIPTION

Figure 1:
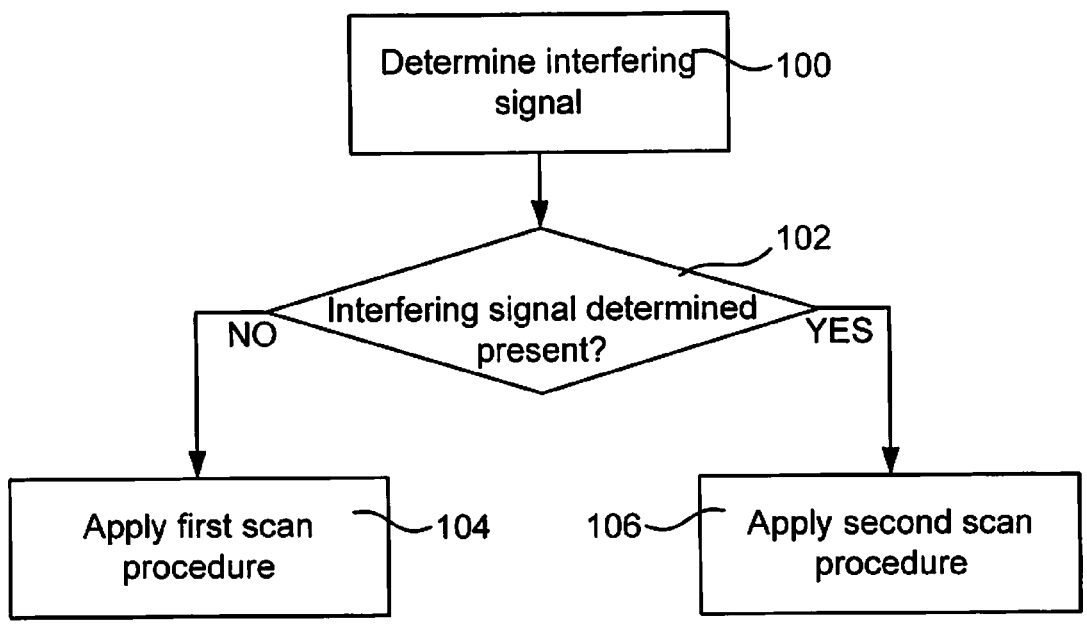
FIG. 1 is a flow chart schematically illustrating a method according to an embodiment.

FIG. 1 is a flow chart schematically illustrating a method according to an embodiment for a cellular phone to find an establish communication with a cellular network. In a signal determination step 100, one or more interfering signals, or no interferers if that is the case, are determined. The determination can be made based on any of the approaches demonstrated with reference to FIG. 3 below.

Information on which frequency or in which frequency band the one or more interfering signals are present can be gained, if there are any interfering signals. In a scan procedure decision step 102, decision is taken whether to apply a first or a second scan procedure.

The purpose of the scan procedures is to find a cellular network, i.e. a base station of the cellular network, to establish communication with, within the field called to "camp on". The scanning is basically a procedure where the terminal listens to a multitude of frequencies within the frequency bands in which the terminal is arranged to perform cellular communication. The listening aims to find signals from base stations, wherein the signals provides information enabling establishment of cellular communication, i.e. to find a base station to camp on, which in the field is called "cell search".

If no interferers are present, the terminal only needs to listen very shortly, e.g. 10 to 200 ms, for each carrier frequency to be able to determine if a base station provides communication on the carrier frequency, and then move on to next carrier frequency if communication has not already been established. In this context, this type of scanning is called plain scanning, and in the present embodiment denoted first scan procedure.

However, if there are interfering signals, e.g. from non-cellular communication such as Bluetooth communication or Wireless Local Area Network communication, the terminal can either fail to decode signals from a base station, or misinterpret present signals in a frequency for being a carrier from a base station although it was a signal or interference caused by a signal emanating from non-cellular communication. This can be handled by using a more complex scan procedure. However, using such a complex scan procedure normally consumes more time and/or energy, especially when considering terminals that are able to perform cellular communication within a multitude of frequency bands.

Thus, the decision step 102 takes into consideration the gained information about any interferers and if it is determined that there are no considerable interferers present, a first scan procedure, i.e. a plain scan procedure, is to be applied in a first scan procedure application step 104, or if there is one or more interferers present, a second scan procedure, i.e. a more complex scan procedure, is to be applied in a second scan procedure application step 106. The second scan procedure can be according to any adapted approach for the determined interference situation, e.g. as any of the embodiments demonstrated with reference to FIGS. 4 and 5 below.

Figure 2:
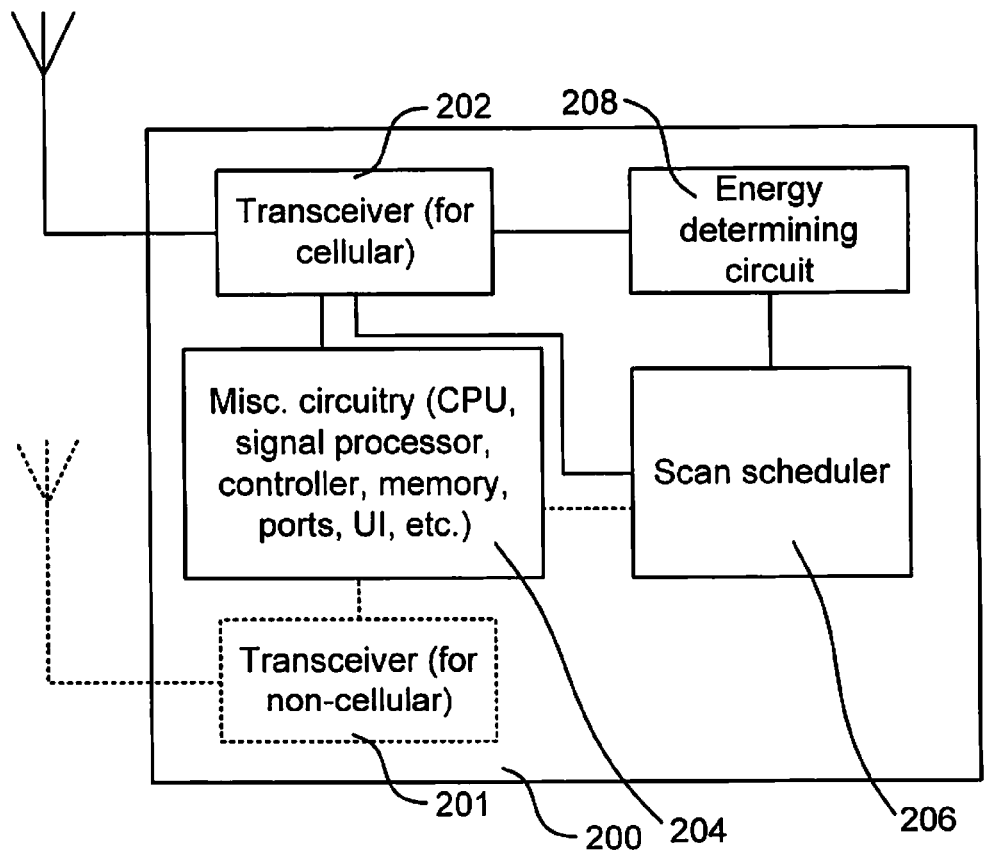
FIG. 2 is a block diagram schematically illustrating an apparatus according to an embodiment.

FIG. 2 is a block diagram schematically illustrating an apparatus 200 according to an embodiment. The apparatus 200 can be a terminal arranged for cellular communication, and optionally also for non-cellular communication. Thus, in the case of the apparatus 200 both being arranged for cellular and non-cellular communication, the interference can be caused by communication in which the apparatus 200 is involved in itself. In such a case, knowledge of the interference can be gained within the apparatus from a mechanism, e.g. a transceiver 201 for the non-cellular communication, providing the non-cellular communication in the apparatus 200.

The apparatus 200 comprises a transceiver 202 for cellular communication which is arranged for communication with one or more base stations in one or more frequency bands. The transceiver 202 is preferably connected to further circuitry 204, which for example can comprise central processing unit, signal processor, controller, memory, ports, and/or user interface, arranged to perform tasks of the apparatus such as working as a cellular communication apparatus, such as a cellular phone, modem device for wireless wide area networks, or communication device for machine to machine communication using a cellular network. The functions and features of the further circuitry 204 are in principle ordinary features and functions within the art and not part of the core of the invention. The further circuitry 204 can be one or more entities which are collected under the term 'further circuitry' for the sake of conciseness, and its purpose is indicating elements that are not directly involved in the particulars of the enhanced scan procedure. However, parts of the further circuitry 204 can be adapted for the features of the invention by being enabled to provide certain information to other elements, and/or by providing adapted signal processing, as will be described below.

The apparatus 200 further comprises a scan scheduler 206. The scan scheduler 206 can be considered a scan controller which control operations of the scan procedure according to the approach indicated with reference to FIG. 1. The scan scheduler 206 is connected to the transceiver 202 for controlling tuning of the transceiver 202 when scanning the frequency bands. The scan scheduler 204 determines whether to apply a first, plain, scan procedure or a second, adapted, scan procedure. The determination can be based on information received from the cellular network, i.e. provided via the transceiver 202 and the further circuitry 204 to an energy determining circuit 208. The determination can alternatively or additionally be based on information on interference caused by the apparatus itself, as discussed above. Here, the bandwidth of the interferer can also be taking into consideration, e.g. a Bluetooth signal having a bandwidth in the order of 1 MHz while a WLAN signal having a bandwidth in the order of 20 MHz, where the meaning of 'frequency in vicinity' of the interferer is considered differently depending on the knowledge of bandwidth of the interferer; the 'vicinity' is broader as the bandwidth of the interferer is broader. The determination can alternatively or additionally be based on measuring signals to determine interferer or interferers. The measuring is preferably performed prior to the scanning by tuning the transceiver 202 to frequencies where interferers may be present, e.g. at ends of the frequency bands to be scanned where non-cellular communication systems may be present close to the frequency band and cause interference at a carrier frequency at the boundary of the frequency band. Any received signal from an interferer is determined by the energy determining circuit 208 which is connected to the transceiver 202 to receive the signal and to the scan scheduler 206 to provide a metric of the interferer. Thus, the signal energy determining circuit 208 can comprise a signal energy metering circuit arranged to measure signal energy of the any interfering signal, and/or a signal energy information receiver arranged to receive information from a source of the any interfering signal.

Based on the knowledge of any interferer or interferers gained by one or more or the above demonstrated approaches, the scan scheduler applies the first scan procedure if it determines that there is no significant interferer, or applies the second scan procedure if it determines that there is a presence of one or more significant interferers. The first scan procedure, i.e. a plain scan procedure, is simply arranged to scan through the frequency bands to find a base station to camp on. The second scan procedure, i.e. any of the adapted scan procedures that will be demonstrated below, will provide a more complex scanning taking the determined interferer or interferers into account.

The second scan procedure can comprise performing additional or adapted signal processing at least for the carrier frequencies that are in a vicinity of a determined interferer. Thus, the scan scheduler 206 controls the part of the further circuitry 204 performing signal processing to adapt signal processing such that any cellular signals received by the transceiver 202 is distinguished from the interferer. Such signal processing may need a larger chunk of signal, wherein the scan scheduler may slow down the scanning, i.e. listen a bit longer for each carrier frequency, at least for those frequencies that are in vicinity of frequency or frequencies of the interferer or interferers, respectively. For example, normal time for each carrier frequency can be 10 to 200 ms, while the longer time can be 1 to 2 seconds. The longer listening time can also be enough in itself, and the normal signal processing can be used to distinguish the cellular signal from the interferer.

The second scan procedure can comprise excluding carrier frequencies that are in a vicinity of a determined interferer. Thus, the scan scheduler 206 controls the transceiver 202 to only tune to carrier frequencies that are not in vicinity of a determined interferer during the scanning.

The scan scheduler 206 and/or the energy determining circuit 208 can be part of other circuitry, such as any of the elements bundled together under the term 'further circuitry', and has been illustrated as separate elements for the sake of understanding the functions of the scan scheduler 206 and the energy determining circuit 208. The scan scheduler 206 and/or the energy meter 208 can of course also be separate circuits.

Figure 3:
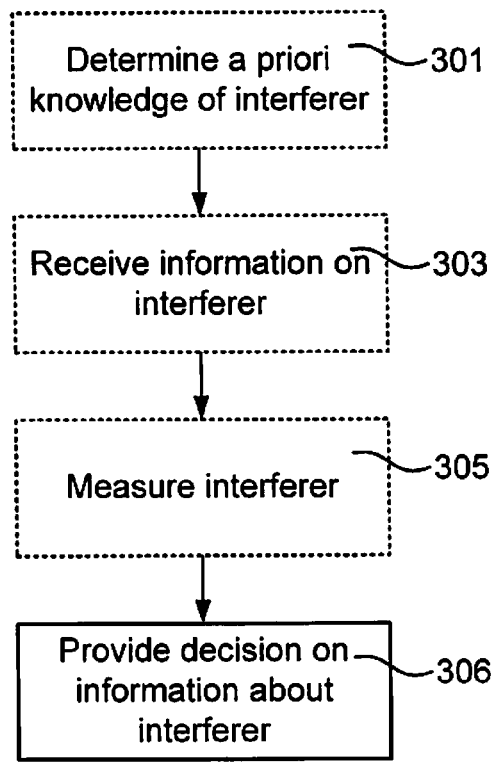
FIG. 3 is a flow chart schematically illustrating a procedure for gaining information about interferers according to an embodiment.

FIG. 3 is a flow chart schematically illustrating a procedure for gaining information about interferers according to an embodiment. As demonstrated with reference to FIG. 2, one or more of steps for determining a priori knowledge of interferer 301, receiving information on interferer 303, and measuring interferer 305 can be used for gaining the information. Thus, one or more of the steps 301, 303, 305 is performed such that at least a decision whether there is a significant interferer can be taken in an interferer information decision step 306. The decision step 306 can comprise comparison of metrics of interferer with threshold values to determine if the information about the interferer(s) should be taken into consideration, i.e. whether any interferer is to be considered 'significant'. The decision step 306 can also comprise arranging the information in a suitable way for using in the adaption of the second scan procedure. The arranged information can comprise the frequency of the interferer, and can also comprise the signal level and/or bandwidth of the interferer.

Figure 4:
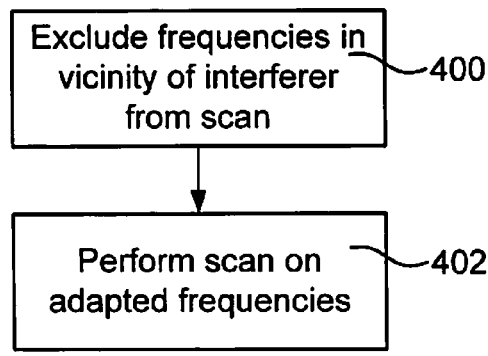
FIG. 4 is a flow chart schematically illustrating a second scanning procedure according to an embodiment.

FIG. 4 is a flow chart schematically illustrating a second scanning procedure according to an embodiment. In a frequency exclusion step 400, carrier frequencies in vicinity of any interferer are excluded from scanning, e.g. by exclusion from a list of carrier frequencies to be scanned. Here, 'vicinity' can either be a fixed value, such as only the closest carrier frequency or the closest three carrier frequencies, counted in frequency, or be an adapted value based on a determined bandwidth and/or signal level of the interferer. The scanning is then performed in a scanning step 402, where the carrier frequencies still to be scanned are tuned in and checked for signals from cellular network devices, i.e. base stations.

Figure 5:
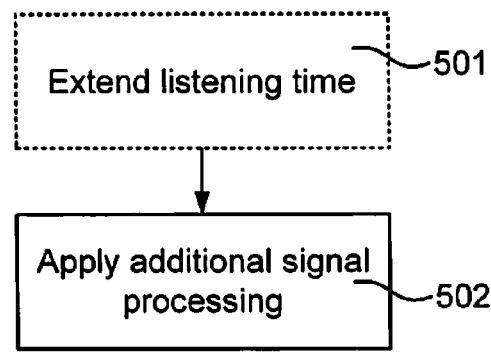
FIG. 5 is a flow chart schematically illustrating a second scanning procedure according to an embodiment.

FIG. 5 is a flow chart schematically illustrating a second scanning procedure according to an embodiment. In a listening time extension step 501, the time for listening for a carrier frequency can be extended, e.g. from normal 10 to 200 ms to extended 1 to 2 seconds, for facilitating distinguishing of the cellular signal from any interferer. This step can be used as a sole action, or as here illustrated in FIG. 5, as an option to applying additional signal processing in an additional signal processing step 502. The additional signal processing can comprise application of filters, e.g. adaptive and/or complex filters, to distinguish cellular signals from any interferer. Upon use of adaptive filters that may need some time to converge, the combination with the extended listening time can be particularly advantageous.

Figure 6:
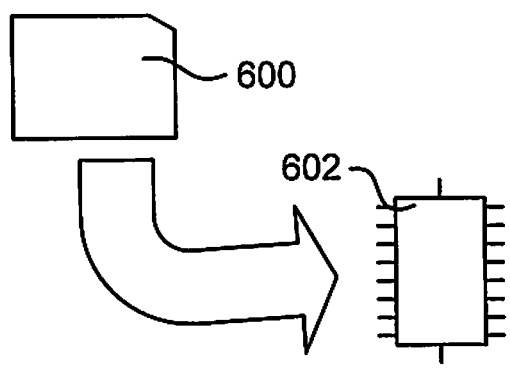
FIG. 6 schematically illustrates a computer readable medium comprising a computer program according to an embodiment.

The methods according to some of the embodiments are suitable for implementation with aid of processing means, such as the CPU and/or signal processor of the further circuitry 204 demonstrated with reference to FIG. 2. Therefore, there is provided computer programs, comprising instructions arranged to cause the processing means or processor of the apparatus to perform the steps of any of the methods according to any of the embodiments described with reference to any of FIGS. 1, 3, 4 and 5. The computer programs preferably comprise program code which is stored on a computer readable medium 600, as illustrated in FIG. 6, which can be loaded and executed by a processing means or processor 602 of the apparatus to cause it to perform the methods, respectively, according to embodiments of the present invention, preferably as any of the embodiments described with reference to any of FIGS. 1, 3, 4 and 5. The processor 602 and computer program product 600 can be arranged to execute the program code sequentially where actions of the any of the methods are performed stepwise, but can also be arranged to perform the actions on a real-time basis, i.e. actions are performed upon request and/or available input data. The processing means or processor 602 is preferably what normally is referred to as an embedded system. Thus, the depicted computer readable medium 600 and processor 602 in FIG. 6 should be construed to be for illustrative purposes only to provide understanding of the principle, and not to be construed as any direct illustration of the elements.

The invention claimed is:

1. A method for initial scanning of frequencies at start-up of a multi-band cellular communication apparatus, the method comprising:
   determining whether there is any interfering signal from any other communication system transmitting at a frequency in vicinity of frequencies of frequency bands of which the multi-band cellular communication apparatus is supposed to establish contact with a base station in at least one of the frequencies within the frequency bands; and
   if the determination gives a result of no interfering signal, applying a first scan procedure comprising plain scanning of the frequencies of the frequency bands of which the multi-band cellular communication apparatus is supposed to establish contact with a base station in at least one of the frequencies within the frequency bands, or
   if the determination gives a result of an interfering signal, applying a second scan procedure taking into account the determined interfering signal, wherein the second scan procedure comprises performing additional signal processing for at least a part of the frequency band being in vicinity of the determined interfering signal at the frequency scan, such that the determined interfering signal is taken into account.

2. The method according to claim 1, wherein the determining whether there is any interfering signal comprises detecting signal energy on at least one frequency in vicinity of frequencies of the frequency bands of which the multi-band cellular communication apparatus is supposed to establish contact with a base station in at least one of the frequencies within the frequency bands.

3. The method according to claim 1, wherein the determining whether there is any interfering signal comprises receiving information about presence of an interfering signal from circuitry within the cellular communication apparatus transmitting at a frequency in vicinity of frequencies of the frequency bands of which the multi-band cellular communication apparatus is supposed to establish contact with a base station in at least one of the frequencies within the frequency bands.

4. The method according to claim 1, wherein the determining whether there is any interfering signal comprises receiving information about probability of presence of an interfering signal from circuitry holding a priori knowledge of such interfering signal.

5. The method according to claim 1, wherein the second scan procedure comprises:
   excluding at least a part of the frequency band being in vicinity of the determined interfering signal from the frequency scan, wherein the exclusion is based on the interfering signal.

6. The method to claim, wherein the second Scan procedure provides increased signal collection for the at least a part of the Frequency band being in vicinity of the determined interfering signal.

7. A non-transitory computer readable storage medium having stored therein program instructions which when executed by a processor cause the processor to perform a method for initial scanning of frequencies at start-up of a multi-band cellular communication apparatus, the method comprising:
   determining whether there is any interfering signal from any other communication system transmitting at a frequency in vicinity of frequencies of frequency bands of which the multi-band cellular communication apparatus is supposed to establish contact with a base station in at least one of the frequencies within the frequency bands; and
   if the determination gives a result of no interfering signal, applying a first scan procedure comprising plain scanning of the frequencies of the frequency bands of which the multi-band cellular communication apparatus is supposed to establish contact with a base station in at least one of the frequencies within the frequency bands, or
   if the determination gives a result of an interfering signal, applying a second scan procedure taking into account the determined interfering signal, wherein the second scan procedure comprises performing additional signal processing for at least a part of the frequency band being in vicinity of the determined interfering signal at the frequency scan, such that the determined interfering signal is taken into account.

8. A frequency scanning apparatus for initial scanning of frequencies at start-up of a multi-band cellular communication apparatus, where there may be any interfering signal from any other communication system transmitting at a frequency in vicinity of frequencies of frequency bands of which the multi-band cellular communication apparatus is supposed to establish contact with a base station in at least one of the frequencies within the frequency bands, the frequency scanning apparatus being arranged to determine whether there is any such interfering signal, and if the result of the determination is no interfering signal, apply a first scan procedure comprising plain scanning of the frequencies of the frequency bands of which the multi-band cellular communication apparatus is supposed to establish contact with a base station in at least one of the frequencies within the frequency bands, or if the result of the determination is an interfering signal, apply a second scan procedure taking into account the determined interfering signal, wherein the second scan procedure comprises performing additional signal processing for at least a part of the frequency band being in vicinity of the determined interferer at the frequency scan, such that the determined interfering signal is taken into account.

9. The frequency scanning apparatus according to claim 8, wherein the second scan procedure comprises excluding at least a part of the frequency band being in vicinity of the determined interferer from the frequency scan, wherein the exclusion is based on the interfering signal.

10. The frequency scanning apparatus according to claim 8, wherein the second scan procedure provides increased signal collection for the at least a part of the frequency band being in vicinity of the determined interfering signal.

11. The frequency scanning apparatus according to claim 8, further being arranged to collect information about any of the interfering signal.

12. The frequency scanning apparatus according to claim 11, wherein the collected information whether there is any interfering signal comprises information about presence of an interfering signal from circuitry within the cellular communication apparatus transmitting at a frequency in vicinity of frequencies of the frequency bands of which the multi-band cellular communication apparatus is supposed to establish contact with a base station in at least one of the frequencies within the frequency bands.

13. The frequency scanning apparatus according to claim 12, wherein the collected information whether there is any interfering signal comprises information about probability of presence of an interfering signal from circuitry holding a priori knowledge of such interfering signal.

14. A radio access circuitry for initial scanning of frequencies at start-up of a multi-band cellular communication apparatus, the circuitry comprising:
    a receiver arranged to tune to any frequency in vicinity of frequencies of frequency bands of which the multi-band cellular communication apparatus is supposed to establish contact with a base station in at least one of the frequencies within the frequency bands;
    a signal energy determining circuit arranged to determine signal energy at the any frequency to determine whether there is any interfering signal from any other communication system transmitting at the any frequency; and
    the frequency scanning apparatus according to claim 8,
    wherein the receiver is further arranged to be tuned to frequencies according to the applied frequency scanning procedure.

15. The radio access circuitry according to claim 14, wherein the signal energy determining circuit comprises a signal energy metering circuit arranged to measure signal energy of the any interfering signal.

16. The radio access circuitry according to claim 14, wherein the signal energy determining circuit comprises a signal energy information receiver arranged to receive information from a source of the any interfering signal.

\* \* \* \* \*

UNITED STATES PATENT AND TRADEMARK OFFICE
CERTIFICATE OF CORRECTION

| | | |
|---|---|---|
| PATENT NO. | : 8,538,469 B2 | Page 1 of 1 |
| APPLICATION NO. | : 13/391304 | |
| DATED | : September 17, 2013 | |
| INVENTOR(S) | : Wilhelmsson et al. | |

It is certified that error appears in the above-identified patent and that said Letters Patent is hereby corrected as shown below:

On the Title Page

Item (73), under "Assignee", in Column 1, Line 2, delete "Stockholm (SE)" and insert -- (publ), Stockholm (SE) --, therefor.

In the Specification

In Column 5, Line 24, delete "scan scheduler 204" and insert -- scan scheduler 206 --, therefor.

In the Claims

In Column 8, Line 21, in Claim 6, delete "method to claim," and insert -- method according to claim 1, --, therefor.

In Column 8, Line 21, in Claim 6, delete "Scan" and insert -- scan --, therefor.

In Column 8, Line 23, in Claim 6, delete "Frequency" and insert -- frequency --, therefor.

Signed and Sealed this
Fifteenth Day of July, 2014

Michelle K. Lee
*Deputy Director of the United States Patent and Trademark Office*